United States Patent
Watanabe (10) Patent No.: US 12,323,820 B2
(45) Date of Patent: Jun. 3, 2025

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Ryo Watanabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 155 days.

(21) Appl. No.: 17/748,243

(22) Filed: May 19, 2022

(65) Prior Publication Data
US 2022/0279362 A1    Sep. 1, 2022

Related U.S. Application Data (63) Continuation of application No. PCT/JP2020/043567, filed on Nov. 24, 2020.

(30) Foreign Application Priority Data

Nov. 28, 2019 (JP) .................... 2019-215597

(51) Int. Cl.
*H04W 16/28* (2009.01)
*G01S 11/06* (2006.01)
(Continued)

(52) U.S. Cl.
CPC ............ *H04W 16/28* (2013.01); *G01S 11/06* (2013.01); *H04B 17/27* (2015.01); *H04W 84/12* (2013.01)

(58) Field of Classification Search
CPC ..... H04W 16/28; H04W 84/12; H04W 28/16; H04W 4/023; G01S 11/06; H04B 17/27; (Continued)

(56) References Cited

U.S. PATENT DOCUMENTS

| | | | |
|---|---|---|---|
| 10,327,125 B2 | 6/2019 | Watanabe | |
| 11,683,077 B2* | 6/2023 | Liao | ............ H04L 25/0202 370/252 |

(Continued)

FOREIGN PATENT DOCUMENTS

| | | |
|---|---|---|
| CN | 102857934 A | 1/2013 |
| CN | 109714092 A | 5/2019 |

(Continued)

OTHER PUBLICATIONS

Notice of Reasons for Refusal issued by the Japanese Patent Office on Aug. 21, 2023 in corresponding JP Patent Application No. 2019-215597, with English translation.

(Continued)

*Primary Examiner* — Kenneth T Lam
(74) *Attorney, Agent, or Firm* — Carter, DeLuca & Farrell LLP (57) ABSTRACT

A communication apparatus that wirelessly communicates with a partner apparatus performs, based on information related to a distance between another communication apparatus and the partner apparatus, determination of whether to execute cooperative communication of operating to reduce influence of interference between communication between the communication apparatus and the partner apparatus, and communication with the other communication apparatus, and controls communication based on a result of the determination.

9 Claims, 4 Drawing Sheets

(51) Int. Cl.
  *H04B 17/27* (2015.01)
  *H04W 84/12* (2009.01)
(58) Field of Classification Search
  CPC .. H04B 7/0626; H04B 17/318; H04B 17/345; H04B 7/0413; H04B 7/024
  See application file for complete search history.

(56) References Cited

U.S. PATENT DOCUMENTS

| | | | | |
|---|---|---|---|---|
| 2012/0057622 | A1* | 3/2012 | Kimura | H04W 56/0045 375/259 |
| 2012/0300666 | A1* | 11/2012 | Jang | H04B 7/026 370/252 |
| 2013/0188565 | A1 | 7/2013 | Wang | |
| 2014/0112288 | A1* | 4/2014 | Wei | H04W 48/20 370/329 |
| 2014/0213249 | A1 | 7/2014 | Kang et al. | |
| 2014/0342746 | A1* | 11/2014 | Nakashima | H04L 5/0048 455/450 |
| 2016/0014668 | A1* | 1/2016 | Chou | H04W 76/14 455/7 |
| 2016/0192347 | A1* | 6/2016 | Kobayashi | H04L 5/0035 370/329 |
| 2018/0180703 | A1* | 6/2018 | Kim | G01S 5/10 |
| 2018/0205434 | A1* | 7/2018 | Cherian | H04B 7/0452 |
| 2018/0263045 | A1 | 9/2018 | Zhou et al. | |
| 2019/0081664 | A1* | 3/2019 | Vermani | H04L 5/0035 |
| 2020/0305103 | A1* | 9/2020 | Chen | H04W 56/001 |
| 2022/0294493 | A1* | 9/2022 | Garcia Rodriguez | H04W 16/28 |
| 2022/0302963 | A1* | 9/2022 | Garcia Rodriguez | H04B 7/0617 |

FOREIGN PATENT DOCUMENTS

| | | |
|---|---|---|
| CN | 110178316 A | 8/2019 |
| KR | 10-2015-0086445 A | 7/2015 |
| WO | 2015/037048 A1 | 3/2015 |

OTHER PUBLICATIONS

Extended European Search Report issued by the European Patent Office on Nov. 20, 2023 in corresponding EP Patent Application No. 20894460.3.

International Search Report issued by the Japan Patent Office on Feb. 2, 2021 in corresponding International Application No. PCT/JP2020/043567, with English translation.

Notice of Reasons for Refusal issued by the Japanese Patent Office on Nov. 3, 2023 in corresponding JP Patent Application No. 2019-215597, with English translation.

Korean Office Action issued in corresponding KR Patent Application No. 10-2022-7020837, dated Aug. 13, 2024, with English translation.

Chinese Office Action issued by the China National Intellectual Property Administration on Jan. 25, 2025 in corresponding CN Patent Application No. 202080078394.6, with English translation.

Korean Office Action issued in corresponding KR Patent Application No. 10-2022-7020837, dated Apr. 22, 2025, with English translation.

* cited by examiner

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2020/043567, filed Nov. 24, 2020, which claims the benefit of Japanese Patent Application No. 2019-215597, filed Nov. 28, 2019, both of which are hereby incorporated by reference herein in their entirety.

BACKGROUND OF THE INVENTION

Field of the Invention

The present invention relates to a communication apparatus, a control method, and a computer-readable storage medium and, more particularly, to a communication control technique in a wireless communication system capable of using cooperative communication.

Background Art

A recent increase in the amount of communicated data has pushed the development of communication techniques such as wireless LAN (Local Area Network). A major communication standard of the wireless LAN is the IEEE (Institute of Electrical and Electronics Engineers) 802.11 standard series. The IEEE 802.11 standard series includes standards such as IEEE 802.11a/b/g/n/ac/ax. For example, the IEEE 802.11ac and IEEE 802.11ax standards standardize advanced communication technologies using MIMO (Multi-Input Multi-Output).

At present, for higher communication performance, a task group has been established to develop an IEEE 802.11be standard as a successor standard of IEEE 802.11ax. A multi-AP coordination configuration in which a plurality of access points (APs) communicate in cooperation has been examined as a system throughput improvement technique in the IEEE 802.11be standard.

US-2018-0263045 describes a scheme in which a plurality of APs or stations (STAs) communicate while reducing the interference between apparatuses using MIMO cooperative beamforming in a wireless LAN compliant with the IEEE 802.11 standard. According to the scheme, for example, to reduce the interference with a communication partner STA of the first AP, the second AP can control signals transmitted from a plurality of antennas of the second AP so that the antenna gain in the direction of the STA takes a very small value such as 0. This can prevent the arrival of a signal transmitted from the second AP at the STA with sufficient power, and prevent reception of a signal transmitted from the STA by the second AP with sufficient power. This antenna control is called null steering. Null steering can be used to suppress the interference with a specific device. However, null steering used under an easy condition of interference may impair the obtainable performance such as communication speed.

SUMMARY OF THE INVENTION

The present invention provides a technique of executing proper control in accordance with a situation in a system capable of using cooperative communication.

According to an aspect of the present invention, there is provided a communication apparatus that performs communication using a radio frame compliant with IEEE802.11 standard with a partner apparatus, comprising a determination unit configured to perform, based on information about a distance between another communication apparatus and the partner apparatus, determination of whether to execute cooperative communication of operating to reduce influence of interference between communication between the communication apparatus and the partner apparatus, and communication with the other communication apparatus, and a control unit configured to control communication based on a result of the determination.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration)

Figure 1:
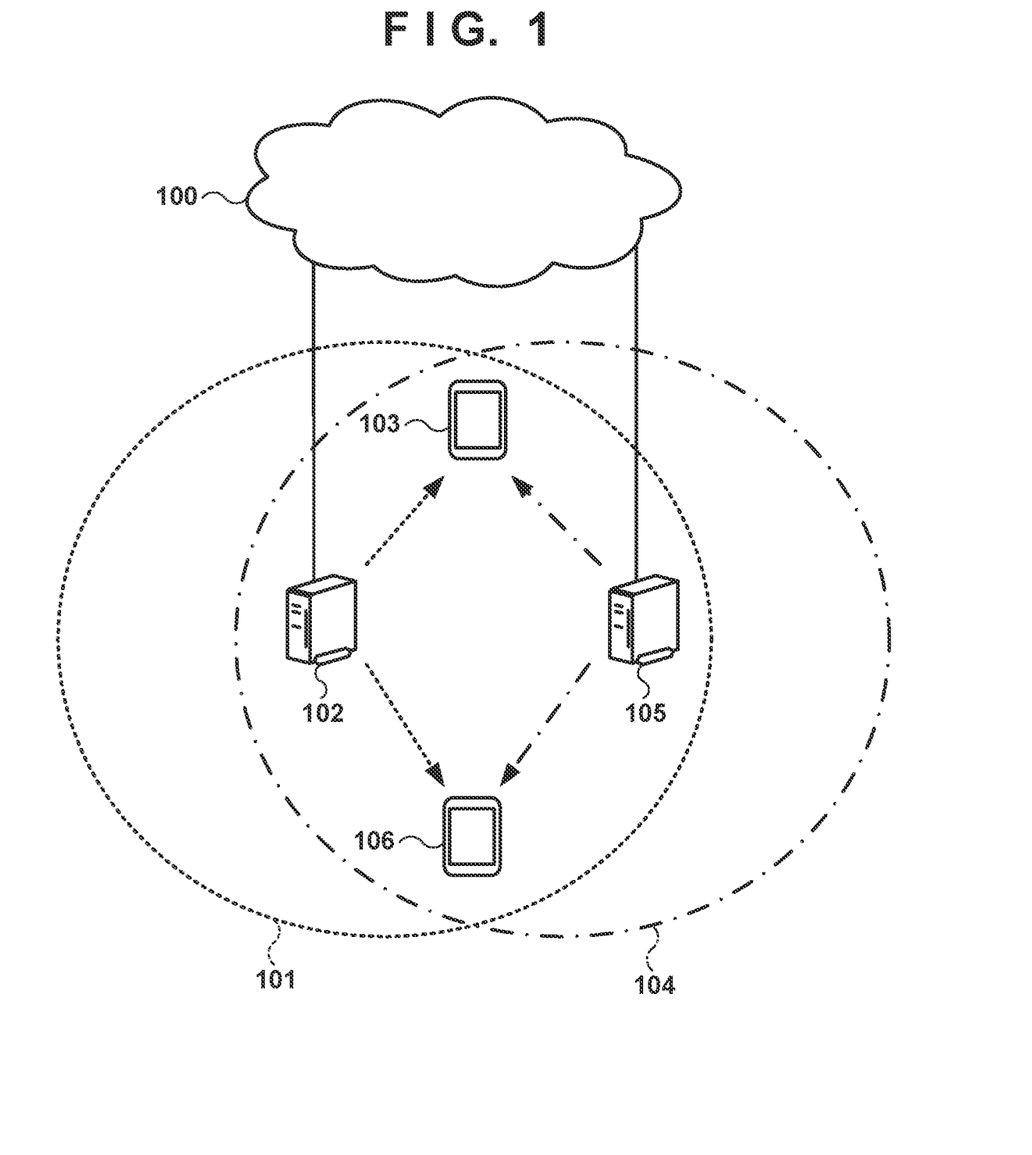
FIG. 1 is a view showing an example of a system configuration.

FIG. 1 shows an example of the configuration of a wireless communication system according to the embodiment. The wireless communication system includes, for example, an AP 102, an AP 105, a STA 103, and a STA 106 in a wireless LAN compliant with the IEEE 802.11 standard series (for example, IEEE 802.11a/b/g/n/ac/ax/be standards). Note that the AP stands for an access point in the wireless LAN, and the STA stands for a station in the wireless LAN. Although two APs and two STAs are illustrated for descriptive convenience, three or more communication apparatuses or only one communication apparatus may exist, as a matter of course.

The APs 102 and 105 can communicate with each other via, for example, a backhaul 100. Note that the backhaul 100 can be formed from a wired communication line such as Ethernet® or telephone line. The backhaul 100 may be formed from a wireless communication line such as LTE (Long Term Evolution) or WiMAX (Worldwide Interoperability for Microwave Access). The APs 102 and 105 may communicate with each other by wireless communication compliant with the IEEE 802.11 standard series without or in addition to the separately configured backhaul 100. In this case, a radio channel used between the APs 102 and 105 may be the same as or different from a radio channel used in communication between the AP 102 or 105 and the STA 103 or 106.

The AP 102 configures and manages a first network 101, and can communicate with a STA (or another AP) participating in the first network 101. The AP 105 configures and manages a second network 104, and can communicate with a STA participating in the second network 104. The APs 102 and 105 have a multi-AP coordination function. Note that the multi-AP coordination function is a function of communicating with a connected station in cooperation with another AP. For example, the AP 102 communicates with the STAs 103 and 106 in cooperation with the AP 105. This can increase the communication speed and improve the communication stability, compared to a case in which the AP 102 singly communicates with these STAs. Note that the communication stability is evaluated from indices or a combination of them, such as whether the signal to noise ratio (SNR) reaches a predetermined level, whether the interference power level is lower than a predetermined level, and whether the delay or jitter is smaller than a predetermined value. In the following description, the multi-AP coordination function will be sometimes called a cooperative communication function.

The cooperative communication function includes, for example, a communication function based on the null steering scheme. In the null steering scheme, for example, when the AP 102 communicates with the STA 103 and the AP 105 communicates with the STA 106 in parallel, the AP 102 reduces the antenna gain in the direction of the STA 106 to be sufficiently low (for example, 0) by antenna control. The AP 105 reduces the antenna gain in the direction of the STA 103 to be sufficiently low (for example, 0) by antenna control. In the following description, sufficiently reducing the antenna gain in a predetermined direction will be sometimes called forming the null in a predetermined direction. Note that the method of using the null steering scheme in the APs 102 and 105 in cooperation is sometimes called coordinated null steering. This method can also be called coordinated beamforming (BF) because beamforming is performed to properly set the null point of a beam emitted from each AP. Further, this method is also called coordinated BF and nulling. Note that antenna control for null steering is performed by changing the phases (and amplitudes in some cases) of radio signals transmitted from a plurality of antennas of the AP. A concrete method is well known, so a detailed description thereof will be omitted. This method can prevent mutual interference between communication between the AP 102 and the STA 103, and communication between the AP 105 and the STA 106. Note that the cooperative communication function may include a function of controlling radio signals transmitted from the antennas of the APs 102 and 105 to improve the reception quality of the radio signals at the STAs 103 and 106 and provide high-speed wireless communication. In the embodiment, null steering is used as the cooperative communication function, and another cooperative communication function is not used.

The STAs 103 and 106 are configured to, for example, establish connections with the APs 102 and 105 and perform wireless communication. Note that these STAs can connect to the AP 102 and establish connections with the AP 105 in parallel, and when these APs communicate in cooperation, communicate in parallel with these APs.

When a method of reducing the influence of interference is used as the cooperative communication function, the communication performance such as throughput sometimes drops. For example, when the AP uses null steering, the antenna gain in the direction of a communication partner STA may decrease as a result of forming the null for interference suppression. In the embodiment, the communication performance of the whole system is improved by preventing the AP from unnecessarily using null steering. An example of the arrangement of an apparatus that executes such processing, and an example of the sequence of processing will be explained below.

(Apparatus Arrangement)

Figure 2:
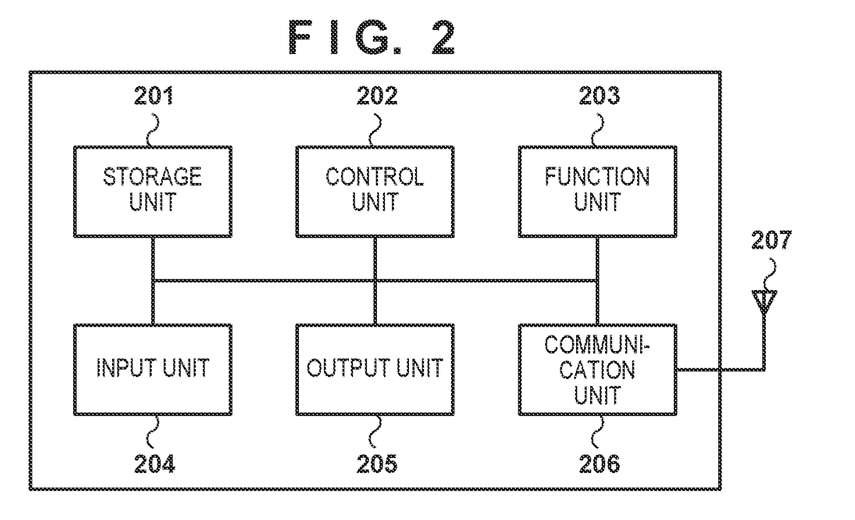
FIG. 2 is a block diagram showing an example of the arrangement of a communication apparatus.

FIG. 2 shows an example of the hardware arrangement of a communication apparatus (AP and STA). The communication apparatus includes, as an example of the hardware arrangement, a storage unit 201, a control unit 202, a function unit 203, an input unit 204, an output unit 205, a communication unit 206, and an antenna 207.

The storage unit 201 is formed from both or either of a ROM (Read Only Memory) and a RAM (Random Access Memory), and stores various kinds of information such as programs for performing various operations (to be described later) and communication parameters for wireless communication. As the storage unit 201, a storage medium such as a flexible disk, a hard disk, an optical disk, a magneto-optical disk, a CD-ROM, a CD-R, a magnetic tape, a nonvolatile memory card, or a DVD may be used in addition to a memory such as a ROM or a RAM.

The control unit 202 is formed from, for example, one or more processors such as a CPU and a MPU, an ASIC (Application-Specific Integrated Circuit), a DSP (Digital Signal Processor), and a FPGA (Field Programmable Gate Array). The CPU is the acronym of a central processing unit, and the MPU is that of a micro processing unit. The control unit 202 controls the whole apparatus by executing programs stored in the storage unit 201. Note that the control unit 202 may control the whole apparatus by the cooperation between programs and an OS (Operating System) stored in the storage unit 201.

The control unit 202 controls the function unit 203 to execute predetermined processing such as the AP function, STA function, image capturing, printing, or projection. The function unit 203 is hardware for executing predetermined processing by the apparatus. For example, when the communication apparatus is an AP, the function unit 203 is configured to execute the AP function including the cooperative communication function. When the communication apparatus is a STA, the function unit 203 establishes a connection with an AP and communicates. For example, when the communication apparatus is a camera, the function unit 203 is an image capturing unit and performs image capturing processing. For example, when the communication apparatus is a printer, the function unit 203 is a printing unit and performs printing processing. For example, when the communication apparatus is a projector, the function unit 203 is a projection unit and performs projection processing. Data to be processed by the function unit 203 may be data stored in the storage unit 201 or data communicated with another AP or STA via the communication unit 206 (to be described later).

The input unit 204 accepts various operations from the user. The output unit 205 performs various outputs to the user. The output by the output unit 205 includes at least one of display on the screen, audio output from the loudspeaker, vibration output, and the like. Note that both the input unit 204 and the output unit 205 may be implemented by one module, like a touch panel.

The communication unit 206 performs control of wireless communication compliant with the IEEE 802.11 standard series, and control of IP communication. The communication unit 206 is a so-called radio chip and may include one or more processors and memories. In the embodiment, the communication unit 206 can execute at least processing compliant with the IEEE 802.11be standard. The communication unit 206 controls the antenna 207 to transmit/receive a radio signal for wireless communication. The communication apparatus communicates contents such as image data, document data, and video data with another communication apparatus via the communication unit 206. The antenna 207 can perform transmission/reception in, for example, at least one of sub-GHz band, 2.4 GHz band, 5 GHz band, and 6 GHz band. Note that frequency bands (and a combination of them) compatible by the antenna 207 are not particularly limited. The antenna 207 may be one antenna or a set of two or more antennas for performing MIMO (Multi-Input and Multi-Output) transmission/reception. For example, the antenna 207 can be configured including 16 antenna elements in order to cope with MIMO communication using 16 spatial streams in the IEEE 802.11be standard.

Figure 3:
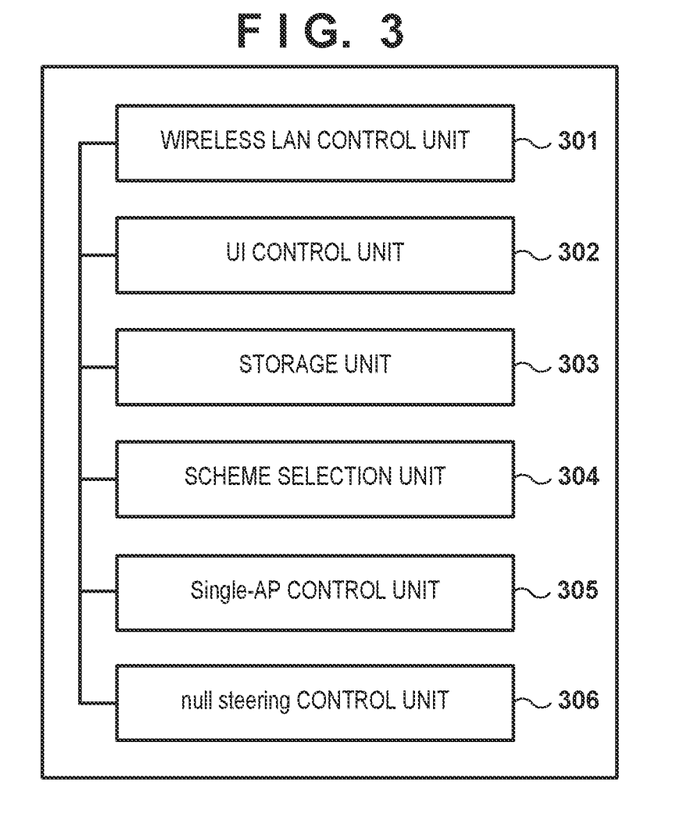
FIG. 3 is a block diagram showing an example of the functional arrangement of the communication apparatus.

FIG. 3 shows an example of the functional arrangement of the AP (APs 102 and 105). The AP includes, for example, a wireless LAN control unit 301, a UI control unit 302, a storage unit 303, a scheme selection unit 304, a single-AP control unit 305, and a null steering control unit 306. Note that these function units are implemented by executing, by the control unit 202 of the AP, programs that are stored in the storage unit 201 and include instructions defining the operations of the respective function units. Note that some or all of the following function units may be implemented by dedicated hardware.

The wireless LAN control unit 301 is configured including, for example, circuits for transmitting/receiving radio signals to/from another apparatus (for example, another AP or STA) compliant with the IEEE 802.11 standard series, and programs for controlling the circuits. The wireless LAN control unit 301 executes communication control to, for example, generate and transmit a frame according to procedures defined in the IEEE 802.11 standard series, or receive a radio frame from another apparatus and extract information. The UI control unit 302 is configured including, for example, hardware units regarding a user interface (UI) such as a touch panel or button for accepting an operation to the AP by the user (not shown) of the AP, and programs for controlling the units. Note that the UI control unit 302 also has a function for presenting information to the user, such as display of an image or the like or audio output. The storage unit 303 is configured including a function of saving programs to be executed by the AP and various data.

The scheme selection unit 304 selects whether to use the cooperative communication function, based on whether there is a neighboring AP, the capability of the neighboring AP, the connection state between the neighboring AP and a STA, a value corresponding to the distance between the neighboring AP and a communication partner apparatus of the AP, and the like. The scheme selection unit 304 determines, for example, which of the null steering scheme serving as the cooperative communication function and a single-AP scheme serving as the non-cooperative communication function is used. Note that the scheme selection method will be described later. When the scheme selection unit 304 selects the single-AP scheme, the single-AP control unit 305 executes communication control to singly connect to a STA without using the cooperative communication function, that is, without cooperating with another AP. For example, the single-AP control unit 305 can control a plurality of antennas of the AP to sufficiently increase the antenna gain in the direction of a communication partner STA without considering the interference. This can improve the communication performance when no cooperative communication is performed. When the scheme selection unit 304 selects the null steering scheme, the null steering control unit 306 communicates by executing control to reduce the interference in cooperation with another AP. For example, in a situation in which a communication partner STA of another AP may get interference, the null steering control unit 306 controls the antenna to form the null in the direction of the STA, and performs cooperative communication control to communicate in parallel with the communication of the other AP. For example, when the communication of the other AP may interfere with a communication partner STA of the AP, the null steering control unit 306 executes cooperative communication control to cause the other AP to execute null steering.

Since a STA is a communication apparatus functioning as a general station in a wireless LAN compliant with the IEEE 802.11 standard series, a description of the function of the STA will be omitted.

(Processing Sequence)

Figure 4:
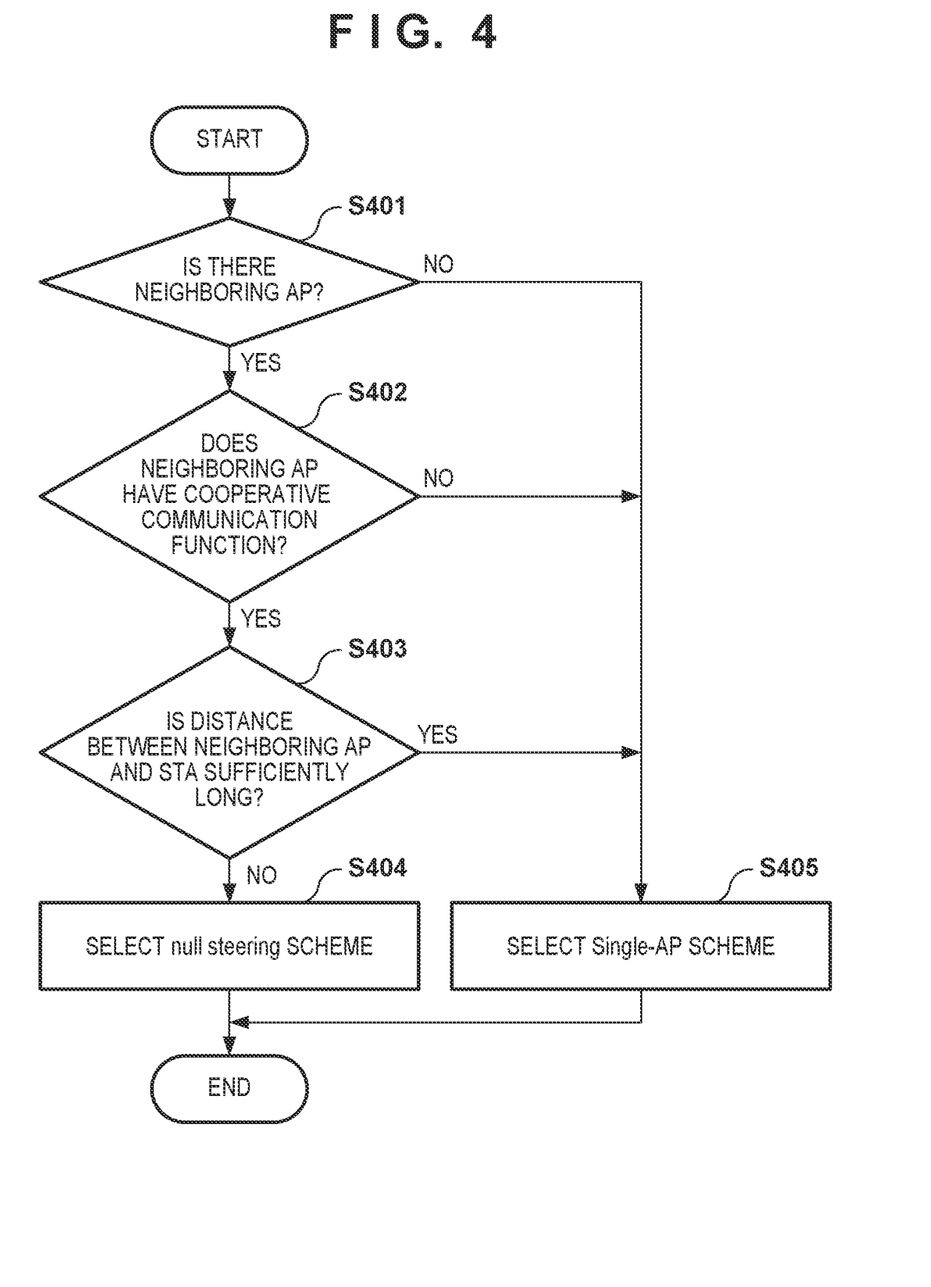
FIG. 4 is a flowchart showing an example of the sequence of processing executed by the communication apparatus.

Next, an example of the sequence of processing of determining by the AP (APs 102 and 105) which of the single-AP scheme and the null steering scheme is used will be described with reference to FIG. 4. This processing is implemented by, for example, executing a program stored in the storage unit 201 by the control unit 202 of the AP. Note that the AP can execute the selection processing when configuring a network at the time of power-on or at an arbitrary timing during the operation of the network.

In the processing, first, the AP searches for a neighboring AP (step S401). For example, the AP searches for a neighboring AP by receiving a beacon transmitted from another AP by a wireless function or receiving a signal broadcast/multicast from another AP via a wired line. Note that the AP can wirelessly transmit a beacon or broadcast/multicast a signal via a wire in order to notify another neighboring AP of the presence of the AP. Alternatively, the AP may specify the presence of another specific AP near the AP by transmitting an inquiry frame to the specific AP and receiving a response to the frame. In the embodiment, the APs 102 and 105 recognize each other as neighboring APs.

If the AP detects a neighboring AP (YES in step S401), it determines whether the neighboring AP has the cooperative communication function (step S402). This determination can be performed based on capability information that is included in a response signal to the beacon or inquiry signal wirelessly received by the AP from the neighboring AP, or a signal received via a wire, and represents whether the cooperative communication function is supported. This determination may also be performed based on other information such as information of the version of a standard supported by the neighboring AP. If the AP determines that there is no neighboring AP having the cooperative communication function (NO in step S401 or NO in step S402), it selects, as a scheme used, the single-AP scheme in which the AP singly communicates with a communication partner STA without performing cooperative communication control with another AP (step S405).

If the AP determines that there is a neighboring AP having the cooperative communication function (YES in step S402), it determines whether the distance between a communication partner STA of the AP and the neighboring AP having the cooperative communication function is sufficiently long (step S403). If the AP determines that the distance between the communication partner STA and the neighboring AP is not sufficiently long (NO in step S403), it selects the null steering scheme as a scheme used (step S404). If the AP determines that the distance between the communication partner STA and the neighboring AP is sufficiently long (YES in step S403), it selects the single-AP scheme as a scheme used (step S405). More specifically, in a situation in which the distance between a communication partner STA and a neighboring AP is sufficiently long, the influence of interference is satisfactorily suppressed by radio range attenuation even without considering the interference from the neighboring AP to the communication partner STA at the time of transmitting a radio signal. In this case, the AP need not cooperate with the neighboring AP and selects the single-AP scheme. To the contrary, when a communication partner STA and a neighboring AP are close at a certain degree, the influence of interference cannot be ignored. To reduce the influence of interference, the null steering scheme is selected. In this case, the AP causes the other AP to execute null steering so as to reduce the interference with the communication partner apparatus of the AP. Alternatively, even the AP itself may execute null steering based on a request from another AP, the distance to a communication partner apparatus of another AP, or the like.

Whether the distance between a communication partner STA and a neighboring AP is long is determined based on, for example, a RSSI (Received Signal Strength Indicator) obtained when the communication partner STA receives a beacon from the neighboring AP. For example, the STA measures the reception strength of the beacon of the neighboring AP, and notifies the AP of the RSSI value. When the notified RSSI is equal to or higher than a predetermined value, the AP can determine that the distance between the communication partner STA and the neighboring AP is sufficiently short. When the RSSI is lower than the predetermined value, the AP can determine that the distance between the communication partner STA and the neighboring AP is sufficiently long.

In addition, the AP can determine, based on various kinds of information about the distance between the communication partner apparatus of the AP and another AP, whether to perform cooperative communication including null steering. For example, on the assumption that the communication partner STA exists near the neighboring AP, the AP determines, based on whether the distance between the AP and the neighboring AP is long, whether the distance between the communication partner STA and the neighboring AP is long. More specifically, when the distance between the AP and the neighboring AP is long, the AP estimates that the distance between the communication partner STA and the neighboring AP is highly likely to be long. When the distance between the AP and the neighboring AP is short, the AP can estimate that the distance between the communication partner STA and the neighboring AP is highly likely to be short. Hence, the AP measures the reception strength of a beacon transmitted from the neighboring AP. When the reception strength is lower than a predetermined value, the AP determines that the distance between the AP and the neighboring AP is long and thus the distance between the communication partner STA and the neighboring AP is also long. When the reception strength of a beacon from the neighboring AP is equal to or higher than the predetermined value, the AP determines that the distance between the AP and the neighboring AP is short and the distance between the communication partner STA and the neighboring AP is also short.

When the communication partner STA and the neighboring AP communicate, the AP may perform the above-described determination using channel state information (CSI) about the communication between the communication partner STA and the neighboring AP. For example, when a SNR value included in the CSI is smaller than a predetermined value, the AP estimates that the distance between the communication partner STA and the neighboring AP is highly likely to be long. When the SNR value included in the CSI is equal to or larger than the predetermined value, the AP estimates that the distance between the communication partner STA and the neighboring AP is highly likely to be short. In this case, the AP can acquire CSI information from the neighboring AP or the communication partner STA and perform the determination. The CSI information can be acquired by transmitting a request signal from the AP to at least either the neighboring AP or the communication partner STA. A signal received when the AP detects a neighboring AP in step S401 may include CSI information between the neighboring AP and a communicating (connecting) STA.

When each of the communication partner STA and the neighboring AP has a positioning function such as GPS (Global Positioning Satellite), the AP may determine based on the positioning result whether the distance between the communication partner STA and the neighboring AP is long. In this case, for example, the AP can perform the determination by acquiring pieces of positioning result information from the communication partner STA and the neighboring AP. For example, when the neighboring AP is communicating with (connecting to) a communication partner STA, the AP may acquire not only information of the positioning result of the neighboring AP but also that of the positioning result of the communication partner STA. Note that it can be determined in step S403 whether the distance between the communication partner STA and the neighboring AP is equal to or longer than a predetermined value. The predetermined value can be determined based on, for example, the frequency band used. That is, the range attenuation is assumed to differ depending on the frequency used, so the predetermined value serving as the determination criterion may be properly determined in accordance with the frequency band used.

Note that the determination in step S403 may be performed based on, for example, information obtained by combining a plurality of kinds of information about the distance as described above.

Figure 5:
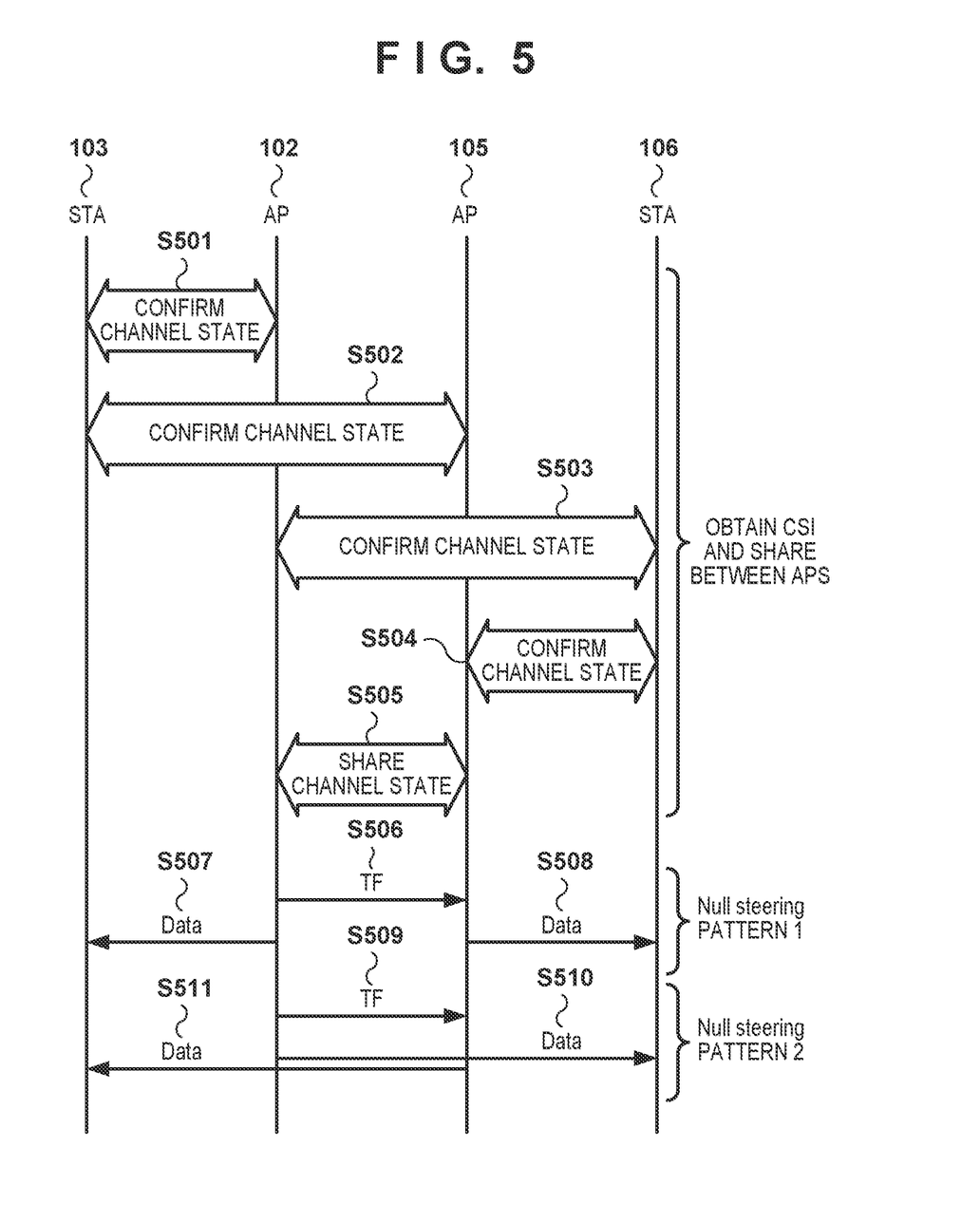
FIG. 5 is a chart showing an example of the sequence of processing executed in the system.

Next, an example of the sequence of processing executed in the wireless communication system according to the embodiment will be described with reference to FIG. 5. In the following example, the APs 102 and 105 are connecting to/communicating with the STAs 103 and 106, respectively, and each AP acquires CSI between the AP and the corresponding STA and determines a scheme used based on the CSI.

First, the AP 102 confirms channel states between the AP 102 and the STAs 103 and 106 (S501 and S503), and the AP 105 also confirms channel states between the AP 105 and the STAs 103 and 106 (S502 and S504). For example, the APs 102 and 105 transmit null data packets (NDPs) not including data, and the STAs 103 and 106 measure channel states in accordance with the NDPs from the APs. The STAs 103 and 106 feed back CSIs to the APs serving as the NDP transmission sources based on the measurement results. Then, the APs 102 and 105 exchange and share the respectively acquired CSIs (S505). By the information exchange, the APs 102 and 105 can also perform in parallel a DownLink MultiUser (DL MU) operation from each AP to a plurality of STAs. In the CSI acquisition, a channel state when a signal is transmitted from the STA to the AP may also be confirmed. This information can be used when performing an UpLink MultiUser (UL MU) operation from a plurality of STAs to an AP. Here, the APs 102 and 105 select the null steering scheme. Note that the processes in S501 to S505 are executed, for example, periodically.

After that, the AP 102 transmits a null steering trigger frame (TF) to the AP 105. The TF is used to specify the timing of the next transmission operation. Which of the APs 102 and 105 transmits the TF may be determined by negotiation, and the negotiation can be performed when, for example, sharing CSI in S505.

The APs 102 and 105 transmit data frames a SIFS (Short Inter Frame Space) time after the TF transmission/reception timing, or after another predetermined time. At this time, the AP 102 transmits a data frame to the STA 103 while performing null steering to direct the null in the direction of the STA 106 (S507). The AP 105 transmits a data frame to the STA 106 while performing null steering to direct the null in the direction of the STA 103 (S508). Accordingly, the communication between the AP 102 and the STA 103 and that between the AP 105 and the STA 106 are performed in parallel without interfering with each other. When the SNR in CSI between the AP 102 and the STA 106 is sufficiently low and that in CSI between the AP 105 and the STA 103 is high, only the AP 105 may execute null steering. Similarly, when the SNR in CSI between the AP 102 and the STA 106 is sufficiently high and that in CSI between the AP 105 and the STA 103 is low, only the AP 102 may execute null steering. That is, in these cases in which a SNR between an AP and a STA not serving as a communication partner is sufficiently low and the interference is considered to be small even if no null steering is performed, the AP may not use null steering. In an environment where the interference is satisfactorily suppressed, nonuse of null steering can suppress a decrease in throughput caused by use of null steering.

Note that the AP 102 may transmit TF to the AP 105 (S509) and transmit a data frame to the STA 106 while performing null steering to direct the null in the direction of the STA 103 (S510). Also, the AP 105 can transmit a data frame to the STA 103 while performing null steering to direct the null in the direction of the STA 106 (S511).

According to the null steering scheme, communication can be performed while suppressing the interference. However, when the distance between an AP and a communication partner STA of another AP is long, the power of interference between the other AP and the STA is predicted to be sufficiently low. In the embodiment, therefore, when the distance between an AP on the interfering side and a STA on the interfered side is long, the AP executes communication with the STA without cooperating with another neighboring AP. In other words, when the AP need not cause the neighboring AP to perform interference suppression control in cooperation with the neighboring AP, it singly communicates with the STA without performing cooperative communication. In an environment where interference hardly occurs, reduction of the interference that may decrease the communication efficiency is not tried, and the communication efficiency can be increased. When the distance between an AP on the interfering side and a STA on the interfered side is short, the AP causes another neighboring AP to execute interference suppression control in cooperation with the neighboring AP, permits a decrease in communication efficiency, and communicates while reducing the interference. According to the embodiment, efficient communication can be performed while considering the distance between communication apparatuses.

In the embodiment, an AP determines, based on the distance between another AP and a STA serving as a communication partner apparatus of the AP, whether to execute cooperative communication in which the other AP is caused to perform null steering. From the viewpoint of the other AP, the AP can determine, based on the distance between the AP and a STA serving as a communication partner apparatus of the other AP, whether to execute cooperative communication with the other AP in a form in which the AP performs null steering. Note that the AP may determine, based on the distance between the AP and a STA serving as a communication partner apparatus of the other AP, whether to execute null steering by the AP. When the first AP causes the second AP to execute null steering, the first AP can transmit an instruction to the second AP in, for example, sharing a channel state in S505. Similarly, when the second AP causes the first AP to execute null steering, the second AP can transmit an instruction to the first AP in, for example, sharing a channel state in S505. Null steering is executed only when necessary, and the communication efficiency can be increased. For example, an AP that transmits TF may instruct an AP that receives the TF, about the use of null steering in this TF, and the AP that transmits TF may determine by itself whether to use null steering in the AP itself. In other words, when performing cooperative communication with another AP, an AP may communicate without receiving an instruction from the other AP as for the AP itself, while causing the other AP to execute predetermined processing (for example, null steering).

Although an AP compliant with the IEEE 802.11 standard series transmits a signal in cooperation with another AP in the above-described example, the present invention is not limited to this. For example, when a plurality of STAs transmit signals in parallel, the AP may perform reception control in cooperation with the other AP as in the above-described processing. For example, when the distance between a communication partner STA of the AP and the other AP is short, the other AP can execute reception antenna control to direct the null in the direction of the STA. In this case, for example, the AP causes a communication partner STA of the other AP and a communication partner STA of the AP to transmit signals in parallel, and at this time performs a cooperative operation so that the other AP performs reception antenna control. Also when cooperative communication is performed between STAs, control as described above may be executed. Further, when a plurality of communication apparatuses communicate with communication partner apparatuses, respectively, regardless of a wireless LAN, each communication apparatus can determine, based on the distance between the communication partner apparatus of the communication apparatus and another communication apparatus, whether to execute cooperative communication with the other communication apparatus. Accordingly, when the influence of interference between communication between a communication apparatus and a communication partner apparatus, and communication with another communication apparatus is sufficiently small and no cooperative control is necessary, a decrease in communication efficiency caused by unnecessarily executing cooperative control can be prevented.

Although transmission antenna control is used in the above-described embodiment, the present invention is not limited to this. For example, an AP may prevent the interference between communication of the AP and communication of another AP by performing predetermined coding (for example, dirty paper coding (DPC) or similar coding). For example, the AP can specify the type of data to be transmitted from the other AP, predict in advance a waveform by which a communication partner apparatus receives the signal transmitted from the other AP, and transmit a signal obtained by subtracting the waveform component from a signal to be transmitted from the AP. The communication partner apparatus can receive the waveform in which the signal that should be transmitted from the AP is reproduced by adding the waveform received from the AP and an interference wave from the other AP. According to this method, the AP acquires in advance information of data to be transmitted and a channel estimate value between a communication partner STA of the AP and the other AP, and perform the cooperative operation to adjust the transmission timings of signals, thereby suppressing the influence of interference. In an environment where the distance between a communication partner STA of an AP and another AP is long, the errors of a channel estimate value and the like are predicted to be large. If the above-described method is used in such an environment, the communication performance is degraded. To prevent this, whether to perform cooperative communication of operating to reduce the influence of interference can be determined based on information about the distance between the communication partner of the AP and the other AP. In an environment where the influence of interference is not sufficiently strong and an interference waveform is buried in noise, it can be prevented to subtract in advance the interference waveform containing a relatively large error. As a result, degradation of the communication performance can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that operates as an access point (AP) and performs communication using a radio frame compliant with IEEE802.11 standard with a partner apparatus that operates as a non-AP station, comprising:
one or more memories that store a set of instructions;
at least one processing circuit, wherein the communication apparatus is caused, by the at least one processing circuit executing the instructions and/or the at least one processing circuit itself operating, to perform operations comprising:
receiving, from the partner apparatus operating as the non-AP station, channel status information (CSI) relating to a communication between the partner apparatus and another communication apparatus operating as an access point; and
controlling, in a case where signal to noise ratio (SNR) included in the received CSI is more than a threshold and in a case where it is determined, based on a negotiation between the communication apparatus and said another communication apparatus operating as an access point, that the communication apparatus transmits a trigger frame for triggering a coordinated beamforming to reduce influence of interference between a communication between the communication apparatus and the partner apparatus, and a communication between said another communication apparatus and a partner apparatus of said another communication apparatus, communication by transmitting the trigger frame to said another communication apparatus.

2. The communication apparatus according to claim 1, wherein in a case where the coordinated beamforming is determined to be executed, control of causing said another communication apparatus to execute null steering for reducing interference with the partner apparatus is performed.

3. The communication apparatus according to claim 2, wherein in a case where the coordinated communication is determined to be executed, control of executing null steering for reducing interference with a partner apparatus of said another communication apparatus operating as an access point is performed.

4. The communication apparatus according to claim 1, wherein the cooperative communication is determined to be executed in a case where the distance between said another communication apparatus operating as an access point and the partner apparatus operating as the non-AP station is close at a certain degree.

5. The communication apparatus according to claim 1, wherein the negotiation is performed along with a sharing of CSI between the communication apparatus and said another communication apparatus.

6. The communication apparatus according to claim 1, wherein the trigger frame is a null steering trigger frame used to specify a timing of a transmission operation of a data frame with a null steering.

7. The communication apparatus according to claim 6, wherein the data frame is transmitted a Short Inter Frame Space (SIFS) time after a transmission of the trigger frame.

8. A control method executed by a communication apparatus that operates as an access point (AP) and performs communication using a radio frame compliant with IEEE802.11 standard with a partner apparatus that operates as a non-AP station, comprising:

receiving, from the partner apparatus operating as the non-AP station, channel status information (CSI) relating to a communication between the partner apparatus and another communication apparatus operating as an access point; and controlling, in a case where signal to noise ratio (SNR) included in the received CSI is more than a threshold and in a case where it is determined, based on a negotiation between the communication apparatus and said another communication apparatus operating as an access point, that the communication apparatus transmits a trigger frame for triggering a coordinated beamforming to reduce influence of interference between a communication between the communication apparatus and the partner apparatus, and a communication between said another communication apparatus and a partner apparatus of said another communication apparatus, communication by transmitting the trigger frame to said another communication apparatus.

9. A non-transitory computer-readable storage medium that stores a computer-readable storage medium that stores a program for causing a communication apparatus that operates as an access point (AP) and performs communication using a radio frame compliant with IEEE802.11 standard with a partner apparatus that operates as a non-AP station to perform a control method, wherein the control method comprising:

receiving, from the partner apparatus operating as the non-AP station, channel status information (CSI) relating to a communication between the partner apparatus and another communication apparatus operating as an access point; and controlling, in a case where signal to noise ratio (SNR) included in the received CSI is more than a threshold and in a case where it is determined, based on a negotiation between the communication apparatus and said another communication apparatus operating as an access point, that the communication apparatus transmits a trigger frame for triggering a coordinated beamforming to reduce influence of interference between a communication between the communication apparatus and the partner apparatus, and a communication between said another communication apparatus and a partner apparatus of said another communication apparatus, communication by transmitting the trigger frame to said another communication apparatus.

* * * * *